(12) United States Patent
Rempel et al.

(10) Patent No.: US 9,822,191 B2
(45) Date of Patent: Nov. 21, 2017

(54) HYDROGENATION OF DIENE-BASED POLYMER LATEX IN THE PRESENCE OF AN IN SITU SYNTHESIZED CATALYST

(71) Applicant: UNIVERSITY OF WATERLOO, Waterloo (CA)

(72) Inventors: Garry L. Rempel, Waterloo (CA); Qinmin Pan, Waterloo (CA); Yin Liu, Mississauga (CA)

(73) Assignee: UNIVERSITY OF WATERLOO, Waterloo (CA)

( * ) Notice: Subject to any disclaimer, the term of this patent is extended or adjusted under 35 U.S.C. 154(b) by 234 days.

(21) Appl. No.: 14/408,460

(22) PCT Filed: Jun. 21, 2013

(86) PCT No.: PCT/IB2013/001322
§ 371 (c)(1),
(2) Date: Dec. 16, 2014

(87) PCT Pub. No.: WO2013/190375
PCT Pub. Date: Dec. 27, 2013

(65) Prior Publication Data
US 2015/0232585 A1  Aug. 20, 2015

(30) Foreign Application Priority Data

Jun. 22, 2012 (EP) .................................... 12173162

(51) Int. Cl.
C08C 19/02 (2006.01)
C08F 8/04 (2006.01)
(52) U.S. Cl.
CPC ................ *C08C 19/02* (2013.01); *C08F 8/04* (2013.01)
(58) Field of Classification Search
CPC .................................. C08F 8/04; C08C 19/02
USPC .................................................. 525/338, 339
See application file for complete search history.

(56) References Cited

U.S. PATENT DOCUMENTS

| | | |
|---|---|---|
| 3,454,644 A | 7/1969 | Dewhirst |
| 4,452,950 A | 6/1984 | Wideman |
| 4,464,515 A | 8/1984 | Rempel |
| 4,631,315 A | 12/1986 | Buding |
| 5,021,469 A | 6/1991 | Langerbeins et al. |
| 5,034,469 A | 7/1991 | Buding |
| 5,039,737 A | 8/1991 | Parker et al. |
| 5,057,581 A | 10/1991 | Rempel et al. |
| 5,087,676 A | 2/1992 | Heider et al. |
| 5,272,202 A | 12/1993 | Kubo et al. |
| 5,340,858 A | 8/1994 | Bauer et al. |
| 5,414,193 A | 5/1995 | Taylor et al. |
| 5,436,289 A | 7/1995 | Aydin et al. |
| 5,442,009 A | 8/1995 | Parker et al. |
| 5,496,882 A | 3/1996 | Aydin et al. |
| 5,498,655 A | 3/1996 | Aydin et al. |
| 5,624,992 A | 4/1997 | Aydin et al. |
| 5,705,571 A | 1/1998 | Tsiang et al. |
| 5,708,077 A | 1/1998 | Nolken et al. |
| 5,756,574 A | 5/1998 | Baumstark et al. |
| 5,994,457 A | 11/1999 | Stanger et al. |
| 6,020,439 A | 2/2000 | Ko et al. |
| 6,403,272 B1 | 6/2002 | Kamada et al. |
| 6,403,727 B1 | 6/2002 | Leube et al. |
| 6,410,657 B1 | 6/2002 | Ko et al. |
| 6,552,132 B2 | 4/2003 | Belt et al. |
| 6,566,457 B2* | 5/2003 | Barghoorn ............ C08F 279/02 525/191 |
| 6,635,718 B2 | 10/2003 | Belt et al. |
| 6,696,518 B1 | 2/2004 | Dersch et al. |
| 7,385,010 B2 | 6/2008 | Rempel et al. |
| 7,767,864 B2 | 8/2010 | Eastham et al. |
| 7,799,872 B2 | 9/2010 | Pan et al. |
| 7,803,883 B2 | 9/2010 | Pan et al. |
| 2006/0145027 A1 | 7/2006 | Warsop et al. |
| 2006/0211827 A1 | 9/2006 | Rempel et al. |
| 2009/0281248 A1* | 11/2009 | Pan ........................ C08C 19/02 525/339 |

FOREIGN PATENT DOCUMENTS

| | | |
|---|---|---|
| JP | 2001288212 A | 10/2001 |
| JP | 2003126698 A | 5/2003 |

OTHER PUBLICATIONS

Lin, Xingwang "Gel Formation in Diimide-Hydrogenated Polymers", Journal of Applied Polymer Science, vol. 96, p. 2005. 1122-1125.
Lin, Xinwang "Hydrogenation of nitrile-butadiene rubber latex with diimide", Applied Catalysis A: General 276 (2004) p. 123-128.
Ullmann's Encylopedia of Industrial Chemistry, 5th Edition, vol. A21, pp. 373-393.
Xiang-Yao, G. "Catalytic Hydrogenation of Nitrile- Butadiene Copolymer Emulsion", Journal of Applied Polymer Science, vol. 65, No. 4, 1997, p. 667-675.
Mudalige, D. "Aqueous-phase hydrogenation of polybutadiene, styrene-butadiene, and nitrile-butadiene polymer emulsions catalyzed by water-soluble rhodium complexes", Journal of Molecular Catalysis A: Chemical 123, 1997, p. 15-20.
Singha, N. K., "A New Method to Hydrogenate Nitrile Rubber in the Latex Form", Rubber Chemistry & Technology, vol. 68, No. 2, 1995, p. 281-286.
Kotzabasakis, V., "Catalytic conversions in aqueous media: a novel and efficient hydrogenation of polybutadiene-1,4—block-polyethylene oxide) catalyzed by Rh/TPPTS complexes in mixed micellar nanoreactors", Journal of Molecular Catalysis A: Chemical 231, 2005, p. 93-101.

(Continued)

*Primary Examiner* — Roberto Rabago

(57) ABSTRACT

A technique of improving the hydrogenation reaction of diene-based polymers, present in aqueous suspension, by in-situ synthesizing the catalyst in the presence of a specific aliphatic alcohol is disclosed. The process allows the selective hydrogenation of the carbon-carbon double bonds in the diene-based polymers with a high degree of hydrogenation and short reactions times. The improved process eliminates the complicated catalyst synthesis operations so far necessary.

15 Claims, No Drawings

(56) References Cited

OTHER PUBLICATIONS

Wei, Z., "Direct Catalytix Hydrogenation of an Acrylonitrile-Butadiene Rubber Latex Using Wilkinson's Catalyst", Macromol. Rapid Commun., 2005, 26, p. 1768-1772.
Osborn, J.A., "Inorganix Syntheses", vol. 28, 1990, p. 67-71.
Wei, Z., "Direct Catalytic Hydrogenation of Unsaturated Diene-based Polymers in Latex Form", Jan. 22, 2007.
Supplement European Search Report in corresponding application No. 13 80 7598 (3 pages) Feb. 15, 2016.

* cited by examiner

HYDROGENATION OF DIENE-BASED POLYMER LATEX IN THE PRESENCE OF AN IN SITU SYNTHESIZED CATALYST

FIELD OF THE INVENTION

The present invention relates to a process for the selective hydrogenation of the carbon-carbon double bonds in diene-based polymers which are present in latex form, this means as a suspension of diene-based polymer particles in an aqueous medium, using a specific catalyst which is synthesized in-situ.

BACKGROUND OF THE INVENTION

It has been known that carbon-carbon double bonds in polymers may be successfully hydrogenated by treating the polymer in an organic solution with hydrogen in the presence of different catalysts. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations e.g. based on cobalt, nickel, rhodium, ruthenium, osmium, and iridium. The suitability of the catalyst depends on the extent of hydrogenation required, the rate of the hydrogenation reaction and the presence or absence of other groups, such as carboxyl and nitrile groups, in the polymers.

Hydrogenation of diene-based polymers has been very successful, if the polymers were dissolved in an organic solvent as e.g. disclosed in U.S. Pat. No. 6,410,657, U.S. Pat. No. 6,020,439, U.S. Pat. No. 5,705,571, U.S. Pat. No. 5,057,581, and U.S. Pat. No. 3,454,644.

However, many diene-based polymers, -copolymers or -terpolymers are made by emulsion polymerization processes and are therefore obtained in latex form, i.a. as polymer particles suspended in the aqueous medium due to the stabilizing effect of emulsifiers, when they are discharged from polymerization reactors. Therefore it is very desirable to directly hydrogenate a diene-based polymer in said latex form and increasing efforts are spent on such direct hydrogenation in the recent decade.

So far significant attention has been paid to the hydrogenation of C=C bonds using hydrazine or a derivative of hydrazine as a reducing agent together with an oxidant like oxygen, air or hydrogen peroxide. The hydrogen source to saturate the C=C bonds is then generated in-situ as a result of the redox reactions in which diimide is also formed as intermediate.

In U.S. Pat. No. 4,452,950 the latex hydrogenation is performed using the hydrazine hydrate/hydrogen peroxide (or oxygen) redox system to produce diimide in situ. $CuSO_4$ or $FeSO_4$ is used as a catalyst.

U.S. Pat. No. 5,039,737 and U.S. Pat. No. 5,442,009 provide a more refined latex hydrogenation process which treats the hydrogenated latex with ozone to break the cross-linked polymer chains which form during or after the latex hydrogenation using the diimide approach.

U.S. Pat. No. 6,552,132 discloses that specific compounds if added before, during or after the latex hydrogenation serve to break cross-links formed during the hydrogenation using the diimide hydrogenation route. The specific compound can be chosen from primary or secondary amines, hydroxylamine, imines, azines, hydrazones and oximes.

U.S. Pat. No. 6,635,718 describes the process for hydrogenating C=C bonds of an unsaturated polymer in the form of an aqueous suspension by using hydrazine and an oxidizing compound in the presence of a metal compound containing a metal atom in an oxidation state of at least 4 (such as Ti(IV), V(V), Mo(VI) and W(VI)) as the catalyst.

In Applied Catalysis A—General Vol. 276, no. 1-2, 2004, 123-128 and Journal of Applied Polymer Science Vol. 96, no. 4, 2005, 1122-1125 detailed investigations relating to the hydrogenation of nitrile butadiene rubber latex via the diimide hydrogenation route are presented which cover examining hydrogenation efficiency and degree of hydrogenation. It has been found that there are side reactions at the inter phase of the latex particles and within the polymer phase, which generate radicals to initiate the cross-linking of polymers in the latex form. Using radical scavengers did not show any evidence in helping to suppress the degree of gel formation.

Although there are methods developed to reduce the cross-linking, the aforementioned diimide route still encounters gel formation problem, especially when high hydrogenation conversion is achieved. Therefore, the resulting hydrogenated rubber mass is difficult to process or is unsuitable for further use because of its macroscopic three dimensional cross-linked structure.

U.S. Pat. No. 5,272,202 describes a process for the selective hydrogenation of the carbon-carbon double bonds of an unsaturated, nitrile-group-containing polymer with hydrogen in the presence of a hydrogenation catalyst being a palladium compound. In this process an aqueous emulsion of the unsaturated, nitrile-group-containing polymer is subjected to the hydrogenation and additionally an organic solvent capable of dissolving or swelling the polymer is used at a volume ratio of the aqueous emulsion to the organic solvent in a range of from 1:1 to 1:0.05. The aqueous emulsion is brought into contact with gaseous or dissolved hydrogen while maintaining an emulsified state.

U.S. Pat. No. 6,403,727 discloses a process for selectively hydrogenating ethylenically unsaturated double bonds in polymers. Said process involves reacting the polymers with hydrogen in the presence of at least one hydrogenation catalyst selected from the salts and complex compounds of rhodium and/or of ruthenium, in an aqueous suspension of the polymers which comprises up to 20% by volume of an organic solvent. The suitable rhodium containing catalysts are rhodium phosphine complexes of the formula $RhX_mL^3L^4(L^5)_n$ wherein X is a halide, the anion of a carboxylic acid, acetylacetonate, aryl- or alkylsulfonate, hydride or the diphenyltriazine anion and $L^3$, $L^4$ and $L^5$ independently are CO, olefins, cycloolefins, dibenzophosphol, benzonitrile, $PR_3$ or $R_2P-A-PR_2$, m is 1 or 2 and n is 0, 1 or 2, with the proviso that at least one of $L^3$, $L^4$ or $L^5$ is one of the above mentioned phosphorus-containing ligands of the formula $PR_3$ or $PR_2-A-PR_2$, wherein R is alkyl, alkyloxy, cycloalkyl, cycloalkyloxy, aryl or aryloxy. U.S. Pat. No. 6,566,457 makes use of the same principal technology of hydrogenating a polymer in latex form in the presence of a ruthenium and/or rhodium containing catalyst in order to prepare graft polymers.

JP 2001-288212 describes a further process for hydrogenating diene-based polymer lattices. Lattices of 2-chloro-1, 3-butadiene (co)polymers are mixed with solutions or suspensions of catalysts in organic solvents which dissolve or swell the (co)polymers, and then contacted with hydrogen. The catalysts used are the so-called Wilkinson-catalysts having the formula $MeCl_a(P(C_6H_5)_3)_b$ wherein Me is a transition-metal, Cl is chlorine, b is an integer and equal to or bigger than 1 and a+b is an integer less than or equal to 6. In the Examples a latex of poly(2-chloro-1,3-butadiene) rubber having a $T_g$ of −42° C. and an average number weight molecular weight M of 150,000 was added to a toluene solution containing $RhCl(PPh_3)_3$ and $Ph_3P$, and hydrogenated at 100° C. and 5.0 MPa for 2 hours to give a hydrogenated polymer with $T_g=-54°$ C. and $M_n=120,000$.

In the Journal of Applied Polymer Science, Vol. 65, no. 4, 1997, 667-675, two processes for the selective hydrogenation of the C=C bonds in nitrile-butadiene rubber ("NBR") emulsions are described, which are carried out in the presence of a number of $RuCl_2(PPh_3)_3$ complex catalysts. One of the processes is carried out in a homogeneous system in which an organic solvent, which can dissolve the NBR polymer and the catalyst and which is compatible with the emulsion, is used. The other process is carried out in a heterogeneous system, in which an organic solvent, which is capable of dissolving the catalyst and swelling the polymer particles but is not miscible with the aqueous emulsion phase, is used. Both processes can realize quantitative hydrogenation of the C=C double bonds with the help of a certain amount of organic solvent to dissolve or swell the polymers.

U.S. Pat. No. 6,696,518 teaches a process for selective hydrogenation of non-aromatic C=C and C≡C bonds in polymers with hydrogen in the presence of at least one hydrogenation catalyst comprising ruthenium and/or rhodium and at least one nonionic phosphorus compound capable of forming a coordinative compound with the transition metal wherein the hydrogenation catalyst is incorporated into the aqueous suspension of the polymer without adding a solvent. Ru and/or Ru complexes or Ru and/or Ru salts are used as catalysts. Examples of preferred nonionic phosphorus compound are $PR_3$ or $R_2P(O)_x(O)_yPR_2$ with R representing e.g. $C_{1-10}$ alkyl, $C_{4-12}$ cycloalkyl, $C_{1-10}$ alkoxy, aryl(oxy) and F; Z being a bivalent hydrocarbon residue; and x, y=0 or 1. For this special case, an acrylic acid-butadiene-styrene copolymer latex was prepared by radical polymerization of a mixture of monomers containing also ruthenium (III) tris-2,4-pentanedionate, which means the Ru salt was dispersed into monomer aqueous solution as the catalyst precursor before the polymerization. After having obtained the aqueous polymer suspension, $Bu_3P$ was added to the latex. The system was stirred for 16 h at ambient temperature followed by hydrogenation at severe conditions for 30 hours at 150° C. and 280 bar. The catalyst was thereby synthesized in-situ, therefore no organic solvent had to be used to transport the catalyst. The hydrogenation is carried out in aqueous suspension instead of in an organic medium, although the in-situ synthesized catalyst is oil-soluble. However, the operating procedure of U.S. Pat. No. 6,696,518, i.e. adding the catalyst precursor to the monomer mixture before the polymerization takes place, is associated with some problems, including that the catalyst precursor may have a negative effect on the polymerization and that some of the catalyst precursor might get deactivated during the polymerization.

J. Molecular Catalysis Vol. 123, no. 1, 1997, 15-20 discloses the hydrogenation of polybutadiene (PBD), as well as of polymers having styrene-butadiene repeating units (SBR) or having nitrile-butadiene repeating units (NBR) which are all present in emulsions. Such hydrogenation is catalyzed by water-soluble rhodium complexes like e.g. $[RhCl(HEXNa)_2]_2$ (HEXNa=$Ph_2P$—$(CH_2)_5$—$CO_2Na$) and $RhCl(TPPMS)_3$ (TPPMS=monosulphonated-triphenylphosphine). The process, however, is carried out in the presence of some organic solvent. Under the conditions employed the catalyst is extracted into the organic phase during reaction. This is attributed to the phase transfer properties of the complex which is rendered by the amphiphilic HEXNa ligand.

In Rubber Chemistry and Technology Vol. 68, no. 2, 1995, 281-286 it is described to use a water-soluble analog of the Wilkinson catalyst, i.e. $RhCl(TPPMS)_3$ (where TPPMS represents monosulphonated-triphenylphosphine), for hydrogenation of nitrile rubber latex without any organic solvent. The hydrogenation occurs under mild conditions (1 atm of hydrogen pressure, 75° C.) without coagulation of the latex, and up to 60 percent hydrogenation can be achieved. It is recognized that the hydrogenation was accompanied by an increase in gel content of the latex.

JP 2003-126698 discloses a process for hydrogenating unsaturated polymer lattices using a water soluble catalyst containing group VIII metals or their compounds and hydrophilic organic phosphine ligands in the absence of organic solvents. In the process as disclosed in the examples, 0.133 mmol (as Rh) chloro(1,5-cyclooctadiene)rhodium dimer was stirred with 0.372 mmol of $P(C_6H_4SO_3Na)_3$ to generate an aqueous solution of the complex catalyst. One part of such catalyst solution was mixed with five parts of butadiene rubber latex without organic solvent for hydrogenation. However, the highest degree of hydrogenation is only about 56% which is unsatisfactory for a scale-up to larger production volumes.

In the Journal of Molecular Catalysis, A: Chemical, Vol 231, no. 1-2, 2005, 93-101 it is reported to perform an aqueous phase hydrogenation of polybutadiene-1,4-block-poly(ethylene oxide) (PB-b-PEO) by using water-soluble Rh/TPPTS complexes. The hydrogenation can be successful only because the PB-b-PEO has water-soluble parts within its polymer chains. In such a hydrogenation system, mixed micelles are formed by mixing the amphiphilic PB-b-PEO with added cationic surfactant dodecyl trimethyl ammonium chloride (DTAC) and n-hexane. Hydrogenation conversion can go up to 100% after one hour catalyzed by Rh/TPPTS complexes ([Rh]=10 ppm or less in aqueous phase) generated in situ from $RhCl_3.3H_2O$ and TPPTS under 80 to 100° C. and 20 bar of $H_2$. A recycling experiment showed that the catalytic activity of the anionic catalytic system, Rh/P $(C_6H_4$-m-$SO_3$—$)_3$, remained high in a consecutive run. The success of this hydrogenation system is mainly due to the fact that PB-b-PEO is an amphiphilic starting material. Therefore, the water-soluble catalyst works for systems which have the amphiphilic polymer material.

In summary, several technical routes have been attempted to hydrogenate C=C double bonds in polymers in the form of latex, which include using hydrazine or a derivative of hydrazine as a reducing agent together with an oxidant like oxygen, air or hydrogen peroxide, directly using oil-soluble catalysts accompanied with a certain amount of organic solvents, and using catalysts containing water-soluble ligands. The hydrazine relevant route has encountered a significant gel formation problem, especially when a high hydrogenation conversion is required, and gel formation is not desired for post processing operations. In all the prior art references using oil-soluble catalysts, a certain amount of organic solvents is still required in order to achieve a reasonable hydrogenation rate. The route using water-soluble catalysts has also encountered significant difficulty in overcoming the cross-linking problem.

In U.S. 2006/0211827 A1 a process for selectively hydrogenating nitrile-butadiene rubber latex without organic solvent is disclosed in which $RhCl(PPh_3)_3$ is used as catalyst and $PPh_3$ is used as co-catalyst. The catalyst is added as pure material or in a small amount of organic solvent. This process can achieve high degrees of hydrogenation and does not show gel formation. However, this method requires long reaction times and high loading of the transition metal for synthesis of the catalyst.

In Macromol. Rapid Commun. Vol 26, 2005, 1768-1772 it is reported that the activity of the catalyst in NBR latex hydrogenation was very low (TOF<28 $h^{-1}$) as it was in a heterogeneous aqueous micelles system.

In EP 2075263 A1 a process for hydrogenation of NBR latex was disclosed using a $RhCl(PPh_3)_3$ as catalyst which was in-situ synthesized from a water soluble rhodium salt together with $PPh_3$. The motivation of this work was to develop an improved technique for the direct hydrogenation of diene-based polymer latex. Although the $RhCl(PPh_3)_3$ could be in-situ synthesized without using the pre-made solid catalyst, the low catalyst synthesis efficiency in the NBR latex greatly affected its activity for hydrogenation.

J. A. Osborn et al. in Inorg. Synth. Vol. 28, 1990, 77-78 reported the standard method for synthesizing RhCl(PPh$_3$)$_3$ and stated that RhCl(PPh$_3$)$_3$ could be synthesized from RhCl$_3$.aq and PPh$_3$ in ethanol. R. Walter et al. in U.S. 2006/7145027 B2 described a new method to synthesize RhCl(PPh$_3$)$_3$ in a water-alcohol mixture. It was found that more uniform solid catalyst could be precipitated finally.

The present invention had the object to provide a novel and improved process allowing the hydrogenation of a diene-based polymer present as an aqueous suspension, i.e. as a latex, with a high degree of hydrogenation within short reaction times. The improved process shall eliminate the complicated catalyst synthesis operations so far necessary.

SUMMARY OF THE INVENTION

The present invention now provides a process for selectively hydrogenating carbon-carbon double bonds in a diene-based polymer comprising subjecting the diene-based polymer which is present in an aqueous suspension to a hydrogenation by contacting the diene-based polymer with a catalytically active system characterized in that
(i) the catalytically active system is based on a first main catalyst component having either the general formula (Ia)

$$MQ_x \cdot aH_2O \quad \text{(Ia)}$$

wherein
M is a group VIII transition noble metal, preferably rhodium, ruthenium, osmium or iridium,
Q is identical or different, and a hydride or an anion other than a hydride,
x is 1, 2, or 3, and
a is in the range of from 0 to 3,
or having the general formula (Ib)

$$RhQ'L_y \quad \text{(Ib)}$$

wherein
Q' is a hydride or an anion other than a hydride,
y is 1, 2, 3 or 4, and
L is identical or different and a water-soluble ligand.
and on a secondary water-insoluble catalyst component having either the general formula (IIa) or the general formula (IIb)

$$R^1{}_mD \quad \text{(IIa)}$$

$$(R^2)_2E\text{-}A\text{-}E(R^2)_2 \quad \text{(IIb)}$$

in which
R$^1$ is identical or different and represents hydrogen, alkyl, preferably C$_1$-C$_8$-alkyl, aryl, preferably C$_6$-C$_{15}$-aryl, cycloalkyl, preferably C$_4$-C$_8$-cycloalkyl, or aralkyl, preferably C$_7$-C$_{15}$-aralkyl,
D is phosphorus, nitrogen, arsenic, sulfur, or a sulphoxide group S=O, and
m is 2 or 3,
R$^2$ is identical or different and represents hydrogen, alkyl, preferably C$_1$-C$_8$-alkyl, aryl, preferably C$_6$-C$_{15}$-aryl, cycloalkyl, preferably C$_4$-C$_8$-cycloalkyl or aralkyl, preferably C$_7$-C$_{15}$-aralkyl,
E is phosphorus, or arsenic,
A represents either a single bond or a divalent spacer group, preferably phenylene or a-(CH$_2$)$_n$— group with n being an integer from 1 to 20 and
(ii) wherein the catalytically active system is prepared in-situ in the presence of an aliphatic C$_1$ to C$_5$ alcohol.

DETAILED DESCRIPTION OF THE INVENTION

The process of the present invention allows a selective hydrogenation of the carbon-carbon double bonds which are present in a diene-based polymer. This means that the double bonds in aromatic or naphthenic groups are not hydrogenated and double or triple bonds between carbon and other atoms such as nitrogen or oxygen are also not affected. The presence of the aliphatic C$_1$ to C$_5$ alcohol during in-situ synthesis of the catalytically active system improves the efficiency of such catalytically active system in the hydrogenation reaction of a diene-based polymer which greatly decreases the hydrogenation reaction time. The complicated catalyst synthesis operations so far necessary can be completely avoided. Besides, under variation of the in-situ reaction time, in-situ temperature and alcohol to water ratio the hydrogenation reaction can be further optimized.

Diene-Based Polymers to be Subjected to Hydrogenation:

Suitable substrates for the hydrogenation process of the present invention are in principle all aqueous suspensions of diene-based polymers which are also called "latex". Such diene-based polymers contain carbon-carbon double bonds. These lattices include both suspensions prepared by free-radical polymerization of aqueous monomer emulsions (primary suspensions) and those whose polymers have been prepared by whatever method or route and are then converted to an aqueous suspension form (secondary suspensions). The term "aqueous suspension" also embraces, in principle, suspensions of microcapsules.

Polymers having carbon-carbon double bonds which may be subjected to the inventive process comprise repeating units based on at least one conjugated diene monomer.

The conjugated diene can be of any nature. In one embodiment (C$_4$-C$_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Especial preference is given to 1,3-butadiene.

In a further embodiment polymers having carbon-carbon double bonds may be subjected to the inventive process which comprise repeating units of not only at least one conjugated diene as monomer (a) but additionally at least one further copolymerizable monomer (b).

Examples of suitable monomers (b) are olefins, such as ethylene or propylene.

Further examples of suitable monomers (b) are vinylaromatic monomers, such as styrene, alpha-methyl styrene, o-chlorostyrene or vinyltoluenes, vinylesters of aliphatic or branched C$_1$-C$_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

A preferred polymer to be used in the present invention is a copolymer of 1,3-butadiene and styrene or alpha-methylstyrene. Said copolymers may have a random or block type structure.

Further suitable copolymers have repeating units derived from at least one conjugated diene and from at least one monomer (b) selected from the group consisting of esters of ethylenically unsaturated mono- or dicarboxylic acids such as acrylic acid, methacrylic acid, maleic acid, fumaric acid and itaconic acid with generally C$_1$-C$_{12}$ alkanols, such as methanol, ethanol, n-propanol, isopropanol, 1-butanol, 2-butanol, isobutanol, tert.-butanol, n-hexanol, 2-ethylhexanol, or C$_5$-C$_{10}$ cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, tert-butyl acrylate, and 2-ethylhexyl acrylate.

Suitable further copolymerizable monomers (b) are α,β-unsaturated nitriles. It is possible to use any known α,β-unsaturated nitrile, preferably a (C$_3$-C$_5$) α,β-unsaturated nitrile such as acrylonitrile, methacrylonitrile, ethacrylonitrile or mixtures thereof. Particular preference is given to acrylonitrile.

A suitable copolymer to be used in the present invention is a so called nitrile rubber (also abbreviated as "NBR") this being a copolymer having repeating units of at least one conjugated diene, preferably 1,3-butadiene, at least one α,β-unsaturated nitrile, preferably acrylonitrile, and optionally one or more further copolymerizable monomers.

A particularly preferred nitrile rubber is thus a copolymer having repeating units derived from acrylonitrile and 1,3-butadiene.

Apart from the conjugated diene and the α,β-unsaturated nitrite, the nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono-oder diesters, as well as the respective anhydrides or amides of said α,β-unsaturated dicarboxylic acids.

As α,β-unsaturated monocarboxylic acids acrylic acid and methacrylic acid are preferred termonomers of such nitrile rubbers.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethylhexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$-cycloalkyl-, more preferably $C_6$-$C_{12}$-cycloalkyl and most preferably the aforementioned cycloalkyl acrylates and methacrylates are used.

It is also possible to use cyanoalkyl esters, in particular cyanoalkyl acrylates or cyanoalkyl methacrylates, in which the number of C atoms in the cyanoalkyl group is in the range of from 2 to 12, preferably α-cyanoethyl acrylate, β-cyanoethyl acrylate or cyanobutyl methacrylate are used.

In another embodiment hydroxyalkyl esters are used, in particular hydroxyalkyl acrylates and hydroxyalkyl methacrylates in which the number of C-atoms in the hydroxylalkyl group is in the range of from 1 to 12, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. polyethyleneglycol(meth) acrylate, polypropyleneglycol(meth)acrylate, glycidyl (meth)acrylate, epoxy(meth)acrylate, N-(2-hydroxyethyl) acrylamide, N-(2-hydroxymethyl)acrylamide or urethane (meth)acrylate.

It is also possible to use mixture of all aforementioned esters of α,β-unsaturated carboxylic acids.

Furthon α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,□β-ethylenically unsaturated dicarboxylic acid monoester monomers include maleic acid monoalkyl esters, preferably monomethyl maleate, monoethyl maleate, monopropyl maleate, and mono n-butyl maleate;

maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;

fumaric acid monocycloalkyl esters, preferably monocyclopentyl fumarate, monocyclohexyl fumarate, and monocycloheptyl fumarate;

fumaric acid monoalkylcycloalkyl esters, preferably monomethylcyclopentyl fumarate, and monoethylcyclohexyl fumarate;

fumaric acid monoaryl ester, preferably monophenyl fumarate;

fumaric acid mono benzyl ester, preferably monobenzyl fumarate;

citraconic acid monoalkyl esters, preferably monomethyl citraconate, monoethyl citraconate, monopropyl citraconate, and mono n-butyl citraconate;

citraconic acid monocycloalkyl esters, preferably monocyclopentyl citraconate, monocyclohexyl citraconate, and monocycloheptyl citraconate;

citraconic acid monoalkylcycloalkyl esters, preferably monomethylcyclopentyl citraconate, and monoethylcyclohexyl citraconate;

citraconic acid mono aryl ester, preferably monophenyl citraconate;

citraconic acid mono benzyl ester, preferably monobenzyl citraconate;

itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;
itaconic acid mono benzyl ester, preferably monobenzyl itaconate.

As α,β-ethylenically unsaturated dicarboxylic acid diester monomers the analoguos diesters based on the above explicitly mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

Composition of Co- and Terpolymers to be Subjected to the Present Process:

In case that the polymer to be subjected to the present process comprises not only repeating units of one or more conjugated dienes, but also repeating units of one or more further copolymerizable monomers, the proportions of conjugated diene(s) and the other copolymerizable monomers may vary within wide ranges:

In case of NBR polymers being used in the present process the proportion of or of the sum of the conjugated dienes is usually in the range from 40 to 90% by weight, preferably in the range from 50 to 85% by weight, based on the total polymer. The proportion of or of the sum of the α,β-unsaturated nitriles is usually from 10 to 60% by weight, preferably from 15 to 50% by weight, based on the total polymer. The proportions of the monomers in each case add up to 100% by weight. Additional termonomers may optionally be present. If used, they are typically present in amounts of from greater than 0 to 40% by weight, preferably from 0.1 to 40% by weight, particularly preferably from 1 to 30% by weight, based on the total polymer. In this case, corresponding proportions of the conjugated diene(s) and/or of the α,β-unsaturated nitrile(s) are replaced by the proportions of the additional termonomers, with the proportions of all monomers in each case adding up to 100% by weight.

The preparation of nitrile rubbers by polymerization of the abovementioned monomers is adequately known to those skilled in the art and is comprehensively described in the polymer literature.

The nitrile rubbers used pursuant to this invention have a Mooney viscosity (ML 1+4 at 100° C.) in the range from 25 to 70, preferably from 30 to 50. This corresponds to a weight average molecular weight $M_w$ in the range 200,000-500,000, preferably in the range 200,000-400,000. A nitrile rubber having a Mooney viscosity of about 34 e.g. has an intrinsic viscosity, determined in chlorobenzene at 35° C., of about 1.1 dL/g. The nitrile rubbers used also have a polydispersity $PDI=M_w/M_n$, where $M_w$ is the weight average molecular weight and is the number average molecular weight, in the range of from 2.0 to 6.0 and preferably in the range 2.0-4.0. The determination of the Mooney viscosity is carried out in accordance with ASTM standard D 1646.

If a polymer is used in the present invention which contains repeating units of one or more conjugated dienes and optionally one or more other copolymerizable monomers like e.g. styrene or alpha-methylstyrene the proportion of the conjugated diene(s) is usually from 15 to 100% b.w. and the proportion of or of the sum of the copolymerizable termonomer(s) is from 0 to 85% b.w. If as other copolymerizable monomers styrene or alphamethyl styrene are used, the proportion of styrene and/or a methyl styrene is preferably from 15 to 60% b.w., while the remainder to 100% b.w. is represented by the conjugated diene(s).

The carbon-carbon double bond containing polymer in the latex form useful in the present invention may be prepared by any method known to those skilled in the art, such as emulsion polymerization, solution polymerization or bulk polymerization. Preferably, the carbon-carbon double bond containing polymer useful in the present invention is prepared in an aqueous emulsion polymerization process as this process directly yields the latex form of the polymer.

Preferably, according to the present invention, the polymer solid content in the aqueous emulsion lies in the range of from 1 to 75% by weight, more preferably from 5 to 30% by weight based on the total weight of the aqueous emulsion.

The preparation of such polymers which are subjected to the process pursuant to this invention is known to the skilled worker and can in principle be carried out by anionic, free-radical or Ziegler-Natta polymerization in solution, in bulk, in suspension or in emulsion. Depending on the type of reaction, the conjugated dienes are 1,4- and/or 1,2 polymerized. For the hydrogenation process of the invention it is preferred to employ polymers prepared by free-radical aqueous emulsion polymerization of the above mentioned monomers (a) and (b). These techniques are sufficiently well known to the skilled worker and are described at length in the literature, for example in Ullmann's Encyclopedia of Industrial Chemistry, $5^{th}$ Edition, Volume A 21, pp 373-393. In general such polymers are prepared in the presence of free-radical initiators and, if desired, surface-active substances such as emulsifiers and protective colloids (see for example Houben Weyl, Methoden der organischen Chemie, Volumen XIV/1, Makromolekulare Stoffe, Georg Thieme Verlag, Stuttgart, 1961, pp 192-208).

Suitable free-radical polymerization initiators include organic peroxides, such as tert-butyl hydroperoxide, benzoyl hydroperoxide, diisopropylbenzoyl peroxide, inorganic peroxides, such as hydrogen peroxide, salts of peroxomono and/or peroxodisulfuric acid, especially the ammonium and/or alkali metal peroxodisulfates (persulfates), and azo compounds, particular preference being given to the persulfates. Preference is also given to combined systems composed of at least one organic reducing agent and at least one peroxide and/or hydroperoxide, such as tert-butyl hydroperoxide and the sodium salt of hydroxymethanesulfonic acid, or hydrogen peroxide and ascorbic acid (as an electrolyte-free redox initiator system) and to combine systems which additionally comprise a small amount of a metal compound which is soluble in the polymerization medium and whose metallic component can exist in a plurality of valence states, for example ascorbic acid/iron(II) sulfate/hydrogen peroxide, it also being possible frequently to replace the ascorbic acid by the sodium salt of hydroxymethanesulfinic acid, sodium sulfite, sodium hydrogensulfite or sodium bisulfite and the hydrogen peroxide by tert-butyl hydroperoxide, alkali metal peroxodisulfates and/or ammonium peroxodisulfate. Instead of a water-soluble iron(II) salt it is also possible to employ a combination of water-soluble Fe/V salts.

These polymerization initiators are employed in customary amounts, such as in amounts of from 0.01 to 5, preferably from 0.1 to 2.0% b.w., based on the monomers to be polymerized.

The monomer mixtures can, if desired, be polymerized in the presence of customary regulators, such as mercaptans, an example of which is tert.-dodecyl mercaptan. These regulators are then used in an amount of from 0.01 to 5% b.w., based on the overall amount of the mixture.

There are no particular restrictions on the emulsifiers that can be used. Preference is given to neutral emulsifiers such as ethoxylated mono, di- and trialkylphenols (ethyleneoxide degree: 3 to 50; Alkyl $C_4$ to $C_9$) or ethoxylated fatty alcohols (ethyleneoxide degree: 3 to 50; alkyl $C_4$ to $C_9$) and/or anionic emulsifiers, such as the alkali metal and ammonium salts of fatty acids (alkyl: $C_{12}$ to $C_{24}$), of alkyl sulfates (alkyl: $C_8$ to $C_{22}$), of sulfuric monoesters of ethoxylated alkanols (ethyleneoxide degree: 4 to 30, alkyl: $C_8$ to $C_{22}$) and of ethoxylated alkylphenols (ethyleneoxide degree: 3 to 50, alkyl: $C_4$ to $C_{20}$), of alkylsulfonic acids (alkyl: $C_8$ to $C_{22}$) and of alkylarylsulfonic acids (alkyl: $C_4$ to $C_{18}$). Further suitable anionic emulsifiers are alkali metal or ammonium salts of mono- or di-$C_{4-24}$ alkyl derivatives of bis(phenyl-sulfonic acid)ether.

Particular preference is given to the alkali metal and/or ammonium salts, especially the sodium salts, of alkylaryl-sulfonic acids, alkylsulfonic acids (eg. sulfonated $C_{12}$-$C_{18}$ paraffin), alkylsulfates (eg. sodium lauryl sulfonate) and of the sulphuric monoesters of ethoxylated alkanols (eg. sulfoxylated ethoxylate of lauryl alcohol with 2 to 3 ethyleneoxide units). Further suitable emulsifiers are the sodium or potassium salts of fatty acids ($C_{12}$-$C_{23}$-alkyl radicals), such as potassium oleate. Additional appropriate emulsifiers are given in Houben-Weyl, loc. Cit., pp. 192-208. Instead of or in a mixture with emulsifiers it is also possible, however, to employ conventional protective colloids, such as polyvinyl alcohol, polyvinylpyrrolidone or amphiphilic block polymers with short hydrophobic blocks, for the purpose of co-stabilization. In general the amount of emulsifiers used, based on the monomers to be polymerized, will not exceed 5% by weight.

The free-radical polymerization reaction can be carried out by the whole-batch initial charge (batch) technique, but is preferably operated, especially on the industrial scale, in accordance with the feed technique. In this latter technique the major amount (generally from 50 to 100% by weight) of the monomers to be polymerized are added to the polymerization vessel in accordance with the progress of the polymerization of the monomers already in the polymerization vessel. In this context; the free-radical initiator system can be either included entirely in the initial charge to the polymerization vessel or else added continuously or in stages to the polymerization reaction at the rate at which it is consumed in the course of the free-radical aqueous emulsion polymerization. In each individual case this will depend, as is known, both on the chemical nature of the initiator system and on the polymerization temperature. The initiator system is preferably supplied to the polymerization zone at the rate at which it is consumed.

The polymerization reaction may also be conducted in the presence of an aqueous polymer suspension as polymer (seed latex). Such techniques are fundamentally known to the skilled worker and are described for example, in DE-A 42 13 967, DE-A 42 13 968, EP-A 567 811, EP 567 812 or EP 567 819, which are incorporated fully herein by reference. In principle it is possible depending on the desired character, to include the seed in the initial charge or to add it continuously or in stages in the course of polymerization. The polymerization is preferably carried out with the seed in the initial charge. The amount of seed polymer is preferably in the range from 0.05 to 5% by weight, preferably from 0.1 to 2% by weight and, in particular, from 0.2 to 1% by weight, based on the monomers a) to d). The polymer particles of the seed latex that is used preferably have weight-average diameters in the range from 10 to 100 nm, preferably fro 20 to 60 nm and in particular, about 30 nm. Preference is given to the use of a polystyrene seed.

The polymerization reaction is preferably carried out above atmospheric pressure. The polymerization time can vary within a wide range, and is generally from 1 to 15 hours, preferably from 3 to 10 hours. The temperature of polymerization is also variable a wide range and, depending on the initiator used, is from about 0 to 110° C.

The polymer suspensions prepared in this way generally have solid contents of up to 75% by weight. For use in the hydrogenation process of the invention it is possible to employ the suspensions with these solid contents. In some cases, however, it is advisable to dilute the suspensions to an appropriate solid content beforehand. The solid content of the suspensions employed is preferably in the range from 5 to 30% by weight, based on the overall weight of suspension.

The surface-active substances still present, in general, in the polymer suspensions, and further substances used, for example, as customary polymerization auxiliaries in emulsion polymerizations, do not have a disruptive effect on the hydrogenation process of the invention. However, it is advisable to subject the polymer suspensions to chemical or physical deodorization before hydrogenation. Physical deodorization, by stripping the residual monomers with steam, is known, for example, from EP-A 584 458. EP-A 327 006 for its part recommends the use of conventional distillation methods. Chemical deodorization takes place preferably by means of a post polymerization following the main polymerization. Such processes are described, for example, in DE-A 383 4734, EP-A 379 892, EP-A 327 006, DE-A 44 19 518, DE-A 44 35 422 and DE-A 44 35 423.

Process of the Present Invention:

In the context of this application the term "in situ" shall mean that the catalytically active system is formed by any of the following alternatives, each of them being performed in the presence of an aliphatic $C_1$ to $C_5$ alcohol (i) by contacting the first main catalyst component having the general formula (Ia) or (Ib) with the secondary catalyst component having either the general formula (IIa) or (IIb) beforehand in an aqueous solution and then without isolating the catalytically active species contacting such catalytically active aqueous solution with the diene-based polymer to be hydrogenated and present as suspension in an aqueous medium or (ii) by adding and thereby contacting the first main catalyst component having the general formula (Ia) or (Ib) with the secondary catalyst component having either the general formula (IIa) or (IIb) directly in the aqueous suspension containing the diene-based polymer to be hydrogenated.

In a preferred embodiment of the first main catalyst component of the general formula (Ia)

$$MQ_x \cdot aH_2O \qquad (Ia)$$

M represents rhodium, ruthenium, osmium or iridium,
Q represents hydrogen or a halide, more preferably a chloride or bromide ion and
x is 1, 2, or 3, in particular 3, when Q is a halide and
a is the average number of $H_2O$ molecules of hydration associated with $MQ_x$, which is in the range of from 0 to 3 and which may represent an integer or a non-integer.

In another preferred embodiment of the first main catalyst component of general formula (Ib)

$$RhQ'L_y \qquad (Ib)$$

Q' is a hydride or an anion other than a hydride, preferably a halide and more preferably a chloride or bromide ion,
y is 2, 3 or 4, preferably 3 when Q' is halide and preferably 4 when Q' is a hydride.
L is a water-soluble ligand having either the general formula (IIIa)

$$R^3{}_nF \qquad (IIIa)$$

in which
$R^3$ is identical or different and represents an alkyl group, preferably a $C_1$-$C_8$-alkyl group, a cycloalkyl group, preferably a $C_4$-$C_8$-cycloalkyl group, an aryl group, preferably a $C_6$-$C_{15}$-aryl group, or an aralkyl group, preferably a $C_7$-$C_{15}$-aralkyl group, wherein at least one of the groups $R^3$ is sulphonated one or more times,
F is phosphorus, arsenic, sulfur, or a sulphoxide group S=O, and
n is 2 or 3, and
or the general formula (IIIb)

$$(R^4)_2G\text{-}A'\text{-}G(R^5)_2 \qquad (IIIb)$$

in which
R⁴ is identical or different and represents an alkyl group, preferably a $C_1$-$C_9$-alkyl group, a cycloalkyl group, preferably a $C_4$-$C_8$-cycloalkyl group, an aryl group, preferably a $C_6$-$C_{15}$-aryl group, or an aralkyl group, preferably a $C_7$-$C_{15}$-aralkyl group,
R⁵ is identical or different and represents an alkyl group, preferably a $C_1$-$C_8$-alkyl group, a cycloalkyl group, preferably a $C_4$-$C_8$-cycloalkyl group, an aryl group, preferably a $C_6$-$C_{15}$-aryl group, or an aralkyl group, preferably a $C_7$-$C_{15}$-aralkyl group, under the proviso that at least one of the groups R⁴ or R⁵ is sulphonated one or more times,
G is phosphorus, or arsenic,
A' represents a spacer group, preferably phenylene or a $C_1$-$C_{20}$ alkylene group or a single bond.

In an even more preferred embodiment $RhCl_3$ is used as first main catalyst component of the general formula (Ia). In another even more preferred embodiment either $RhCl(TPPMS)_3$ or $RhCl(TPPTS)_3$ are used as first main catalyst component of the general formula (Ib) wherein TPPMS represents monosulphonated-triphenylphosphine, i.e. $P(C_6H_5)_2(m\text{-}C_6H_4SO_3^-)$ and TPPTS represents trisulphonated-triphenylphosphine, i.e. tris(3-sulfophenyl)phosphine, $P(C_6H_4\text{-}3\text{-}SO_3)_3$.

Further Examples of the first main catalyst component pursuant to general formula (Ia) are given in EP 2072535 A1 and further examples of the first main catalyst component pursuant to general formula (Ib) are given in EP 2075263 A1, the disclosure of which is incorporated by reference as far as allowed by the respective jurisdiction.

The most preferred first main catalyst components are $RhCl_3$ or $RhCl(TPPMS)_3$.

In a preferred embodiment of the secondary water-insoluble catalyst component of general formula (IIa)

$R^1$ is identical or different and represents hydrogen, $C_1$-$C_8$-alkyl, $C_6$-$C_{15}$-aryl, $C_4$-$C_8$-cycloalkyl or $C_7$-$C_{15}$-aralkyl,
D is phosphorus or nitrogen, and
m is 3.

In a further preferred embodiment of the secondary catalyst component of general formula (IIb)

$R^2$ is identical or different and represents hydrogen, $C_1$-$C_8$-alkyl, $C_6$-$C_{15}$-aryl, $C_4$-$C_8$-cycloalkyl, or $C_7$-$C_{15}$-aralkyl,
E is phosphorus or nitrogen, and
A represents 1,4-phenylene or a $C_1$-$C_8$-alkylene group or a single bond.

In the context of this application a catalyst component or catalyst is considered as "water-insoluble" if 0.001 or less parts by weight can be completely dissolved in 100 parts by weight of water at 24+/−2° C., while a catalyst or catalyst component is considered as "water-soluble" if 0.5 or more parts by weight can be completely dissolved in 100 parts by weight of water at 24+/−2° C.

In a preferred embodiment a catalytically active system on the basis of the following secondary water-insoluble catalyst component of general formula (IIa) is used, wherein
$R^1$ is hydrogen, cyclohexyl or phenyl,
D is P or N, and
m is 3.

Suitable secondary water-insoluble catalyst components of general formula (IIa) are triaryl-, trialkyl-, tricycloalkyl-, diaryl monoalkyl-, dialkyl monoaryl-, diaryl monocycloalkyl-, dialkyl monocycloalkyl-, dicycloalkyl monoaryl- or dicycloalkyl monoaryl phosphines.

Further examples of secondary water-insoluble catalyst components pursuant to general formula (IIa) and (IIb) are also given in U.S. Pat. No. 4,631,315, EP 2075263 A1 and EP 2072535 A1 the disclosure of which is incorporated by reference as far as allowed by the respective jurisdiction. Such secondary catalyst components are water-insoluble.

The most preferred secondary water-insoluble catalyst component pursuant to general formula (II) is triphenylphosphine.

In a particularly preferred embodiment the catalytically active system is based on $RhCl_3.3H_2O$ as first main catalyst component and $PPh_3$ as secondary water-insoluble catalyst component.

The in-situ synthesis process in the polymer latex is greatly improved with the addition of the aliphatic $C_1$ to $C_5$ alcohol co-solvent, wherein preferably methanol, ethanol or iso-propanol are used as alcohol, more preferably iso-propanol.

The amount of alcohol is not critical, but should be chosen in a way that the NBR as well as HNBR do not precipitate during hydrogenation under the other reaction parameters chosen like e.g. hydrogenation temperature. The alcohol is preferably used with up to 60% by volume, more preferably with up to 55% by volume and even more preferably in a range of 5% to 55% by volume, based on the volume of the water present in the process according to the present invention.

The in-situ preparation of the catalytically active system is preferably performed before the hydrogenation is started. It has proven to be a viable embodiment of the process of the present invention to perform the in-situ preparation of the catalytically active system at a temperature in the range of from 50° C. to 200° C., preferably at a temperature in the range of from 80° C. to 160° C. Typically the time for such in-situ preparation may be varied in a broad range and may last up to 50 hours, and is preferably in a range of 0.5 hour to 24 hours, and even more preferably of from 0.5 to 10 hours.

The process of the present invention can be undertaken in any suitable reactor equipped with temperature regulating and agitating means.

In one embodiment of the present invention the polymer latex, i.e. the aqueous suspension of the diene-based polymer to be hydrogenated, is fed into the reactor and degassed as required, and the first main catalyst component of general formulae (Ia) or (Ib) as well as the secondary water-insoluble catalyst component of formulae (IIa) or (IIb) are added to such aqueous suspension. The temperature of the reactor is then raised to the temperature mentioned above, i.e. in a range of from 50° C. to 200° C., preferably in the range of from 80° C. to 160° C. for an appropriate period of time as outlined above to allow the catalytically active system to form. In the alternative the reactor containing the aqueous suspension of the diene-based polymer to be hydrogenated can already be heated to the temperature mentioned above before the first main catalyst component as well as the secondary water-insoluble catalyst component are added. After the appropriate period of time for in-situ preparation of the catalytically active component the reactor is pressurized with hydrogen.

In a further embodiment of the present invention the polymer latex, i.e. the aqueous suspension of the diene-based polymer to be hydrogenated, is fed into the reactor and degassed as required, and then the catalytically active system is added as an aqueous solution which has been prepared beforehand in-situ but separately by contacting the first main catalyst component with the secondary water-insoluble catalyst component. In such embodiment the reactor containing the diene-based polymer latex are heated prior the solution of the catalytically active species being added.

In a further alternative embodiment of the present invention, an aqueous solution of the catalytically active system which has been prepared beforehand in-situ but separately by contacting the first main catalyst component with the secondary water-insoluble catalyst component is added into the reactor, and then the diene-based polymer latex is fed into the reactor and degassed as required. After all materials have been charged to the reactor the reaction mixture is heated to the desired temperature.

The hydrogenation is typically performed at a hydrogenation temperature in the range of from 35° C. to 180° C., preferably in the range of from 80° C. to 160° C. and at a hydrogen pressure of from 0.1 to 20 MPa, preferably at a pressure of from 1 to 16 MPa. Typically the hydrogenation is carried out with essentially pure hydrogen gas.

During the course of the hydrogenation reaction hydrogen is added to the reactor. The hydrogenation time is from about one quarter of an hour to about 100 hours, depending on operational conditions. The extent to which the carbon-carbon double bonds in the polymer can be hydrogenated can be varied broadly. Preferred are hydrogenation degrees in the range of from 80 to 100%, preferably from 90 to 100% and more preferably from 95 to 100%.

The hydrogenation may optionally be carried out in the presence of ammonium salts like e.g. cetyl trimethyl ammonium bromide (CTAB).

When the hydrogenation reaction is complete to the extent desired, the reaction vessel can be cooled and vented. The resultant hydrogenated diene-based polymer can be used in latex form obtained, if desired, or may be coagulated and washed, to obtain the hydrogenated polymer in solid form.

In one embodiment the present invention relates to a process for selectively hydrogenating carbon-carbon double bonds in a copolymer having repeating units of butadiene and acrylonitrile comprising subjecting said copolymer which is present in an aqueous suspension to a hydrogenation by contacting the said copolymer with a catalytically active system which is based on either $RhCl_3$ or $RhCl(TPPMS)_3$ as first main catalyst component and triphenylphosphine as secondary water-insoluble catalyst component, wherein the catalytically active system is prepared in-situ in the presence of an aliphatic $C_1$ to $C_5$ alcohol.

In a further preferred embodiment the present invention relates to a process for selectively hydrogenating carbon-carbon double bonds in a copolymer having repeating units of butadiene and acrylonitrile comprising subjecting said copolymer which is present in an aqueous suspension to a hydrogenation by contacting the said copolymer with a catalytically active system which is based on either $RhCl_3$ or $RhCl(TPPMS)_3$ as first main catalyst component and triphenylphosphine as secondary water-insoluble catalyst component, wherein the catalytically active system is prepared in-situ by contacting $RhCl_3$ or $RhCl(TPPMS)_3$ with triphenylphosphine at a temperature in the range of from 50° C. to 200° C., preferably 80° C. to 160° C. in the presence of an aliphatic $C_1$ to $C_5$ alcohol selected from the group consisting of methanol, ethanol and 2-propanol wherein the aliphatic $C_1$ to $C_5$ alcohol is used with up to 60% by volume, more preferably with up to 55% by volume and even more preferably in a range of from 5% to 55% by volume, based on the volume of the water present in the aqueous suspension during hydrogenation.

In an even more preferred embodiment the present invention relates to a process for selectively hydrogenating carbon-carbon double bonds in a copolymer having repeating units of butadiene and acrylonitrile comprising subjecting said copolymer which is present in an aqueous suspension to a hydrogenation by contacting the said copolymer with a catalytically active system which is based on either $RhCl_3$ as first main catalyst component and triphenylphosphine as secondary water-insoluble catalyst component, wherein the catalytically active system is prepared in-situ by contacting $RhCl_3$ with triphenylphosphine at a temperature in the range of from 80° C. to 160° C. in the presence of an aliphatic $C_1$ to $C_5$ alcohol selected from the group consisting of methanol, ethanol and 2-propanol wherein the aliphatic $C_1$ to $C_5$ alcohol is used in a range of from 5% to 55% by volume, based on the volume of the water present in the aqueous suspension during hydrogenation and the subsequent hydrogenation is performed at a temperature in the range of from 35° C. to 180° C., preferably in the range of from 80° C. to 160° C. and at a hydrogen pressure in the range of from 0.1 to 20 MPa, preferably of from 1 to 16 MPa.

The invention is further illustrated but is not intended to be limited by the following examples.

EXAMPLES

The following examples illustrate the scope of the invention and are not intended to limit the same. The materials used in the hydrogenation reactions are listed in Table 1.

TABLE 1

| Specification of the Materials | |
| --- | --- |
| Materials | Supplier |
| butadiene-acrylonitrile polymer latex with a solid content of 19.5 wt %, containing 66% butadiene and 34 % acrylonitrile; mean diameter of the polymer particles in the latex: about 72 nm. | Lanxess Emulsion Rubber S.A. |
| $RhCl_3$ aq (as first main catalyst component) | Johnson Matthey |
| triphenylphosphine (99%) (as secondary water-insoluble catalyst component) | Sigma-Aldrich |
| hydrogen (99.999%) | Praxair |
| nitrogen (99.99%) | Praxair |
| ethanol (Reagent grade) | Fisher Scientific |
| methanol (Reagent grade) | Fisher Scientific |
| mono-chlorobenzene (Reagent grade) | Fisher Scientific |
| 2-propanol (Reagent grade) | Sigma-Aldrich |
| 2-butanone (99%) | Sigma-Aldrich |

Example Series 1: Variation of Ingredients for In-Situ Catalyst Preparation

The hydrogenation results of this example series 1 are shown in Table 3.

Example 1: In-Situ Preparation of the Catalyst $RhCl(PPh_3)_3$ by Reacting $RhCl_3$.aq and TPP with Ethanol A 300 ml glass lined stainless steel autoclave having temperature control means, an agitator and hydrogen gas addition points was used. 25 ml of the butadiene-acrylonitrile polymer latex identified in Table 1, 65 ml water, 10 ml ethanol, 0.01370 g of the first catalyst component $RhCl_3$.aq and 0.4752 g TPP were charged into the reactor. The latex was then degassed with nitrogen. The temperature was quickly increased to 145° C. for 60 minutes to in-situ synthesize RhCl(PPh$_3$)$_3$. After that, 1000 psi (6.9 MPa) hydrogen gas was purged into the mixture for hydrogenation reaction. After 17 hours with stirring at 500 rpm, the hydrogenation degree reached 94.7%. No visible gel was generated and the resultant polymer was soluble in methyl ethyl ketone.

Comparative Example 1a

The same reactor and NBR latex was used as in example 1, however, no ethanol was added for the in-situ synthesizing of RhCl(PPh$_3$)$_3$.

25 ml of such a NBR latex, 75 ml water, 0.01366 g of the catalyst precursor RhCl$_3$.aq and 0.4760 g TPP were charged into the reactor. The latex was then degassed with nitrogen. The temperature was quickly increased to 145° C. After that, 1000 psi (6.9 MPa) hydrogen gas was purged into the mixture for hydrogenation reaction. The hydrogenation result is shown in Table 3. After 43 hours with stirring at 500 rpm, the hydrogenation degree reached 94%. Compared with Example 1, the reaction time for NBR latex hydrogenation was much longer without the addition of ethanol in this Comparative Example 1a.

Comparative Example 1b

The same reactor and NBR latex was used as in example 1, however, solid RhCl(PPh$_3$)$_3$ was added together with TPP and no ethanol was added to the mixture.

25 ml of such NBR latex, 75 ml water, 0.0475 g of RhCl(PPh$_3$)$_3$ and 0.4757 g TPP were charged into the reactor. The latex was then degassed with nitrogen. The temperature was quickly increased to 145° C. After that, 1000 psi (6.9 MPa) hydrogen gas was purged into the mixture for hydrogenation reaction. After 48 hours with stirring at 500 rpm, the hydrogenation degree reached 95%.

Comparative Example 1c

The same reactor and NBR latex was used as in example 1, however, solid RhCl(PPh$_3$)$_3$ was added together with TPP and ethanol.

25 ml of such a latex, 65 ml water, 10 ml ethanol, 0.0477 g of RhCl(PPh$_3$)$_3$ and 0.4759 g TPP were charged into the reactor. The latex was then degassed with nitrogen. The temperature was quickly increased to 145° C. After that, 1000 psi (6.9 MPa) hydrogen gas was purged into the mixture for hydrogenation reaction. After 46 hours with stirring at 500 rpm, the hydrogenation degree reached 95%. Despite the fact that ethanol was added the reaction time for NBR latex hydrogenation could not be increased in a recognizable manner when using solid RhCl(PPh$_3$)$_3$.

Comparative Example 1d

The same reactor and NBR latex was used as in example 1, however, the catalyst precursor RhCl$_3$.aq was used without TPP.

25 ml of such a latex, 75 ml water and 0.01365 g of RhCl$_3$.aq were charged into the reactor. The latex was then degassed with nitrogen. The temperature was quickly increased to 145° C. After that, 1000 psi (6.9 MPa) hydrogen gas was purged into the mixture for hydrogenation reaction. After 2 hours with stirring at 500 rpm no hydrogenation was observed at all. RhCl$_3$.aq alone can not trigger NBR latex hydrogenation.

TABLE 2

Summary of ingredients for NBR latex hydrogenation in EXAMPLE SERIES 1

| Example | Inventive | Comparison | | | |
|---|---|---|---|---|---|
| | 1 | 1a | 1b | 1c | 1d |
| Ingredients | | | | | |
| NBR latex (ml) | 25 | 25 | 25 | 25 | 25 |
| Water (ml) | 65 | 75 | 75 | 65 | 75 |
| RhCl(PPh$_3$)$_3$ (g) | — | — | 0.0475 | 0.0477 | — |
| RhCl$_3$.aq (g) | 0.01370 | 0.01366 | — | — | 0.01365 |
| Triphenylphosphine (g) | 0.4752 | 0.4760 | 0.4757 | 0.4759 | — |
| Ethanol (ml) | 10 | — | — | 10 | — |

TABLE 3

Hydrogenation results for EXAMPLE SERIES 1
(NBR latex hydrogenation with different catalytic systems)

| Example 1 (inventive) | | Comparison Example 1a | | Comparison Example 1b | | Comparison Example 1c | | Comparison Example 1d | |
|---|---|---|---|---|---|---|---|---|---|
| Time* (hrs) | HD** (%) | Time* (hrs) | HD** (%) | Time* (hrs) | HD** (%) | Time* (hrs) | HD** (%) | Time* (hrs) | HD** (%) |
| 1 | 28.1 | 1 | 10 | 2 | 10 | 2 | 12 | 2 | 0 |
| 2 | 43.5 | 4 | 32 | 6 | 29 | 5 | 32 | 10 | 0 |
| 4 | 63.9 | 7.5 | 50 | 17 | 68 | 10 | 50 | | |
| 10 | 86.4 | 16 | 70 | 30 | 86 | 20 | 71 | | |

TABLE 3-continued

Hydrogenation results for EXAMPLE SERIES 1
(NBR latex hydrogenation with different catalytic systems)

| Example 1 (inventive) | | Comparison Example 1a | | Comparison Example 1b | | Comparison Example 1c | | Comparison Example 1d | |
|---|---|---|---|---|---|---|---|---|---|
| Time* (hrs) | HD** (%) | Time* (hrs) | HD** (%) | Time* (hrs) | HD** (%) | Time* (hrs) | HD** (%) | Time* (hrs) | HD** (%) |
| 14 | 92.1 | 24 | 79 | 48 | 95 | 30 | 87 | | |
| 17 | 94.7 | 28 | 83 | | | 40 | 92 | | |
| | | 34 | 86 | | | 46 | 95 | | |
| | | 43 | 94 | | | | | | |

*Time was recorded when adding $H_2$ to the reactor.
**HD means hydrogenation degree

Example Series 2: Variation of Temperature During In-Situ Synthesis

The hydrogenation results of this example series 2 are shown in Table 4.

Example 2

25 ml of such the NBR latex identified in Table 1, 65 ml water, 10 ml ethanol, 0.01370 g of the catalyst precursor $RhCl_3$.aq and 0.4756 TPP were charged into the reactor. The latex was then degassed with nitrogen. The in-situ temperature was at 50° C. for 60 minutes. After that, the temperature was quickly increased to 145° C. and 1000 psi (6.9 MPa) hydrogen gas was purged into the mixture for hydrogenation reaction. After 38 hours with stirring at 500 rpm, a hydrogenation degree of 93% was achieved.

Example 2a

The same procedure as described in example 2 was employed except the in-situ temperature was 80° C. The results are illustrated in Table 4. After 31 hours with stirring at 500 rpm, a hydrogenation degree of 95% was achieved.

Example 2b

The same procedure as described in example 2 was employed except the in-situ temperature was 100° C. The results are illustrated in Table 4. After 23 hours with stirring at 500 rpm, a hydrogenation degree of 95% was achieved.

Example 2c

The same procedure as described in example 2 was employed except the in-situ temperature increased to 130° C. After 20 hours with stirring at 500 rpm, a hydrogenation degree of 95% was achieved and no visible gel was generated.

Example 2d

The same procedure as described in example 2 was employed except the in-situ temperature was further increased to 160° C. The results are illustrated in Table 4. After 17 hours with stirring at 500 rpm, a hydrogenation degree of 95% was achieved and no visible gel was generated.

TABLE 4

EXAMPLE SERIES 2 (In-situ process under different in-situ temperatures)

| Example | $RhCl_3$.aq g | $PPh_3$ g | In-situ Temperature ° C. | Hydrogenation Time* Hrs | Conversion mol-% |
|---|---|---|---|---|---|
| 2 | 0.01370 | 0.4756 | 50 | 38 | 93 |
| 2a | 0.01372 | 0.4751 | 80 | 31 | 95 |
| 2b | 0.01372 | 0.4752 | 100 | 23 | 95 |
| 2c | 0.01370 | 0.4740 | 130 | 20 | 95 |
| 2d | 0.01374 | 0.4761 | 160 | 17 | 95 |

*hydrogenation time was recorded when adding $H_2$ to the reactor.

Example Series 3: Variation of In-Situ Reaction Time

The hydrogenation results of this example series 3 are shown in Table 5.

Example 3a

The same procedure as described in example 1 was employed. However, a shorter in-situ reaction time (30 min) was used. The results are illustrated in Table 5. A hydrogenation degree of 95% was achieved at 30 hours with stirring at 500 rpm and no visible gel was generated.

Example 3b

The same procedure as described in example 3a was employed except the in-situ time increased to 10 hours. A hydrogenation degree of 95% was achieved at 15 hours with stirring at 500 rpm and no visible gel was generated.

Example 3c

The same procedure as described in example 3a was employed except the in-situ synthesis time increased to 24 hours. A hydrogenation degree of 95% was achieved at 14 hours with stirring at 500 rpm and no visible gel was generated.

TABLE 5

EXAMPLE SERIES 3 (In-situ process under different in-situ reaction times)

| Example | RhCl₃.aq (g) | PPh₃ (g) | In-situ synthesis time (hrs) | Hydrogenation Time (hrs) | Conversion (mol-%) |
|---|---|---|---|---|---|
| 3a | 0.01370 | 0.4752 | 0.5 | 30 | 95 |
| 3b | 0.01370 | 0.4751 | 10 | 15 | 95 |
| 3c | 0.01370 | 0.4752 | 24 | 14 | 95 |

*hydrogenation time was recorded when adding $H_2$ to the reactor.

Example Series 4: Variation of Alcohol to Water Ratio

The hydrogenation results of this example series 4 are shown in Table 6.

Example 4a

The same procedure as described in example 1 was employed. However, 70 ml water and 5 ml ethanol were used instead of 65 ml water and 10 ml ethanol. A hydrogenation degree of 94% was achieved a 25 hours with stirring at 500 rpm and no gel was formed.

Example 4b

The same procedure as described in example 1 was employed except 55 ml water and 20 ml ethanol were used. A hydrogenation degree of 95% was achieved a 15 hours with stirring at 500 rpm and no gel was formed.

Example 4c

The same procedures as described in example 1 was employed. 45 ml water and 30 ml ethanol were used. A hydrogenation degree of 35% was achieved at 1 hour but solid NBR was broken out after that.

TABLE 6

EXAMPLE SERIES 4 (NBR latex hydrogenation under in-situ process with different ratios of water to ethanol)

| Example | RhCl₃ · aq (g) | PPh₃ (g) | Ethanol (ml) | Water added (ml) | Water contained in the NBR latex (ml) | Volume ratio alocohol:water | Hydrogenation Time (hrs) | Conversion (mol-%) |
|---|---|---|---|---|---|---|---|---|
| 4a | 0.01370 | 0.4756 | 5 | 70 | 20.13 | 0.06:1 | 25 | 94 |
| 4b | 0.01372 | 0.4751 | 20 | 55 | 20.13 | 0.27:1 | 15 | 95 |
| 4c | 0.01374 | 0.4761 | 35 | 45 | 20.13 | 0.54:1 | 1 | 35 |

Example Series 5: Variation of Alcohol Type Used

The hydrogenation results of this example series 5 are shown in Table 7.

Example 5a

The same procedure as described in example 1 was employed. However, methanol was used instead of ethanol. A hydrogenation degree of 94% was achieved a 21 hours and no gel was formed.

Example 5b

The same procedure as described in example 4a was employed. However, more methanol (20 ml) and less water (55 ml) was added. A hydrogenation degree of 95% was achieved a 16 hours and no gel was formed.

Example 5c

The same procedure as described in example 1 was employed except 2-propanol (10 ml) was added. A hydrogenation degree of 95% was achieved a 17 hours and no gel was formed.

Example 5d

The same procedure as described in example 4c was employed except more 2-propanol (20 ml) and less water (55 ml) was added. A hydrogenation degree of 95% was achieved a 12 hours and no gel was formed.

TABLE 7

NBR latex hydrogenation under in-situ process with different kinds of alcohols

| No | RhCl₃ · aq (g) | PPh₃ (g) | Alcohol (ml) | Water (ml) | Hydrogenation Time (hrs) | Conversion (mol-%) |
|---|---|---|---|---|---|---|
| 5a | 0.01389 | 0.47429 | methanol, 10 ml | 65 | 21 | 94 |
| 5b | 0.01370 | 0.47591 | methanol, 20 ml | 55 | 16 | 95 |
| 5c | 0.01362 | 0.47391 | 2-propanol, 10 ml | 65 | 17 | 95 |
| 5d | 0.01338 | 0.47558 | 2-propanol, 20 ml | 55 | 12 | 95 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The results clearly show under a broad variety of operating conditions that a high degree of hydrogenation can be achieved with the process of the present invention.

The invention claimed is:

1. A process for selectively hydrogenating carbon-carbon double bonds in a diene-based polymer, the process comprising subjecting a diene-based polymer in an aqueous suspension to a hydrogenation by contacting the diene-based polymer with a catalytically active system wherein:
(i) the catalytically active system is based on:
a first main catalyst component having:
the general formula (Ia)

$$MQ_x \cdot aH_2O \qquad (Ia)$$

wherein
M is a group VIII transition noble metal,
Q is identical or different, and a hydride or an anion other than a hydride,
x is 1, 2, or 3, and
a is 0 to 3, or
the general formula (Ib)

$$RhQ'L_y \qquad (Ib)$$

wherein
Q' is a hydride or an anion other than a hydride,
y is 1, 2, 3 or 4, and
is identical or different and a water-soluble ligand, and
a secondary water-insoluble catalyst component having:
the general formula (IIa) or the general formula (IIb)

$$R^1{}_mD \qquad (IIa)$$

$$(R^2)_2E\text{-}A\text{-}E(R^2)_2 \qquad (IIb)$$

in which
$R^1$ is identical or different and represents hydrogen, alkyl, aryl, cycloalkyl or aralkyl,
D is phosphorus, nitrogen, arsenic, sulfur, or a sulphoxide group S=O,
m is 2 or 3,
$R^2$ is identical or different and represents hydrogen, alkyl, aryl, cycloalkyl or aralkyl,
E is phosphorus, nitrogen, or arsenic, and
A represents either a single bond or a divalent spacer group, and
(ii) the catalytically active system is prepared in-situ in the presence of an aliphatic $C_1$ to $C_5$ alcohol.

2. The process according to claim 1, wherein the diene-based polymer contains repeating units of at least one ($C_4$-$C_6$) conjugated diene.

3. The process according to claim 2, wherein the diene-based polymer additionally contains repeating units of at least one further copolymerizable monomer (b).

4. The process according to claim 3, wherein the diene-based polymer is a copolymer of 1,3-butadiene and acrylonitrile.

5. The process according to claim 1, wherein the catalytically active system is formed by any of the following alternatives, each of them being performed in the presence of the aliphatic $C_1$ to $C_5$ alcohol:
(i) by contacting the first main catalyst component having the general formula (Ia) or (Ib) with the secondary water-insoluble catalyst component having either the general formula (IIa) or (IIb) beforehand in an aqueous solution and then, without isolating the catalytically active species, contacting such catalytically active solution with the diene-based polymer to be hydrogenated and present in latex form; or
(ii) by adding and thereby contacting the first main catalyst component having the general formula (Ia) or (Ib) with the secondary water-insoluble catalyst component having either the general formula (IIa) or (IIb) directly in a latex containing the diene-based polymer to be hydrogenated.

6. The process according to claim 1, wherein the first main catalyst component has either:
the general formula (Ia) in which
M represents rhodium, ruthenium, OSMIUM or iridium,
Q represents hydrogen or a halide, and
x is 1, 2, or 3, and
a is the average number of $H_2O$ molecules of hydration associated with $MQ_x$, which is 0 to 3 and which may represent an integer or a non-integer, or
the general formula (Ib) in which
Q' is a hydride or an anion other than a hydride,
y is 2, 3 or 4, and
L is a water-soluble ligand having either:
the general formula (IIIa)

$$R^3{}_nF \qquad (IIIa)$$

in which
$R^3$ is identical or different and represents an alkyl group, a cycloalkyl group, an aryl group, or an aralkyl group, wherein at least one of the groups $R^3$ is sulphonated one or more times,
F is phosphorus, arsenic, sulfur, or a sulphoxide group S=O, and
n is 2 or 3, or
the general formula (IIIb)

$$(R^4)_2G\text{-}A'\text{-}G(R^5)_2 \qquad (IIIb)$$

in which
$R^4$ is identical or different and represents an alkyl group, a cycloalkyl group, an aryl group, or an aralkyl group,
$R^5$ is identical or different and represents an alkyl group, a cycloalkyl group, an aryl group, or an aralkyl group,
under the proviso that at least one of the groups $R^4$ or $R^5$ is sulphonated one or more times,
G is phosphorus, or arsenic, and
A' represents a spacer group.

7. The process according to claim 1, wherein the first main catalyst component of general formula (Ia) is $RhCl_3$ or the first main catalyst component of general formula (Ib) is either $RhCl(TPPMS)_3$ or $RhCl(TPPTS)_3$, wherein TPPMS represents monosulphonated-triphenylphosphine and TPPTS represents trisulphonated-triphenylphosphine.

8. The process according to claim 1, wherein the secondary water-insoluble catalyst component has either:
the general formula (IIa) in which
$R^1$ is identical or different and represents hydrogen, $C_1$-$C_8$-alkyl, $C_6$-$C_{15}$-aryl, $C_4$-$C_8$-cycloalkyl or $C_7$-$C_{15}$-aralkyl,
D is phosphorus or nitrogen, and
m is 3, or
the general formula (IIb) in which
$R^2$ is identical or different and represents hydrogen, $C_1$-$C_8$-alkyl, $C_6$-$C_{15}$-aryl, $C_4$-$C_6$-cycloalkyl, or $C_7$-$C_{15}$-aralkyl,
E is phosphorus or nitrogen, and
A represents 1,4-phenylene or a $C_1$-$C_8$-alkylene group or a single bond.

9. The process according to claim 1, wherein the catalytically active system is based on $RhCl_3 \cdot 3H_2O$ as the first main catalyst component, and $PPh_3$ as the secondary water-insoluble catalyst component.

10. The process according to claim 1, wherein the aliphatic $C_1$ to $C_5$ alcohol is selected from the group consisting of methanol, ethanol or iso-propanol.

11. The process according to claim 1, wherein an amount of the $C_1$ to $C_5$ alcohol used is up to 60% by volume, based on the volume of the water present in the hydrogenation process.

12. The process according to claim 1, wherein the in-situ preparation of the catalytically active system is performed at a temperature of 50° C. to 200° C.

13. The process according to claim 1, wherein either:
(a) the aqueous suspension of the diene-based polymer to be hydrogenated is fed into a reactor and degassed as required, the first main catalyst component of general formulae (Ia) or (Ib) as well as the secondary water-insoluble catalyst component of formulae (IIa) or (IIb) are then added to such aqueous suspension, and the temperature of the reactor is raised to a temperature of 50° C. to 200° C., or
(b) a reactor containing the aqueous suspension of the diene-based polymer to be hydrogenated is heated to a temperature of 50° C. to 200° C., the first main catalyst component as well as the secondary water-insoluble catalyst component are added, and the reaction mixture is kept at this temperature for a time period of up 50 hours, or
(c) the aqueous suspension of the diene-based polymer to be hydrogenated is fed into a reactor and degassed as required, and then the catalytically active system is added as an aqueous solution which has been prepared beforehand in-situ but separately by contacting the first main catalyst component with the secondary water-insoluble catalyst component at a temperature of 50° C. to 200° C., or
(d) the aqueous solution of the catalytically active system, which has been prepared beforehand in-situ but separately by contacting the first main catalyst component with the secondary water-insoluble catalyst component at a temperature of 50° C. to 200° C., is added into a reactor, and then the aqueous suspension of the diene-based polymer is fed into the reactor and degassed as required, and after either step a), b), c) or d), the reactor is pressurized with hydrogen, and the diene-based polymer is hydrogenated at a temperature of 35° C. to 180° C.

14. The process according to claim 1, wherein the process is a process for selectively hydrogenating carbon-carbon double bonds in a copolymer having repeating units of butadiene and acrylonitrile, and the process comprises subjecting the copolymer, which is present in an aqueous suspension, to a hydrogenation by contacting the said-copolymer with a catalytically active system which is based on either $RhCl_3$ or $RhCl(TPPMS)_3$ (wherein TPPMS represents monosulphonated-triphenylphosphine) as the first main catalyst component and triphenylphosphine as the secondary water-insoluble catalyst component, wherein the catalytically active system is prepared in-situ in the presence of an aliphatic $C_1$ to $C_5$ alcohol.

15. The process according to claim 1, wherein the process is a process for selectively hydrogenating carbon-carbon double bonds in a copolymer having repeating units of butadiene and acrylonitrile, and the process comprises subjecting the copolymer, which is present in an aqueous suspension, to a hydrogenation by contacting the copolymer with a catalytically active system which is based on either $RhCl_3$ or $RhCl(TPPMS)_3$ as the first main catalyst component and triphenylphosphine as the secondary water-insoluble catalyst component, wherein the catalytically active system is prepared in-situ by contacting $RhCl_3$ or $RhCl(TPPMS)_3$ with triphenylphosphine at a temperature of 50° C. to 200° C. in the presence of an aliphatic $C_1$ to $C_5$ alcohol selected from the group consisting of methanol, ethanol and 2-propanol, wherein the aliphatic $C_1$ to $C_5$ alcohol is used with up to 60% by volume, based on the volume of the water present in the aqueous suspension during hydrogenation, and the subsequent hydrogenation is performed at a temperature of 35° C. to 180° C. and at a hydrogen pressure of 0.1 to 20 MPa.

* * * * *